United States Patent
Elgressy et al.

(10) Patent No.: US 7,836,121 B2
(45) Date of Patent: Nov. 16, 2010

(54) DYNAMIC EXECUTABLE

(75) Inventors: Moshe Elgressy, Nofit (IL); Kenneth Bob, Plainview, NY (US)

(73) Assignee: iPass Inc., Redwood Shores, CA (US)

( * ) Notice: Subject to any disclaimer, the term of this patent is extended or adjusted under 35 U.S.C. 154(b) by 168 days.

(21) Appl. No.: 10/547,484

(22) PCT Filed: Apr. 14, 2005

(86) PCT No.: PCT/US2005/012558

§ 371 (c)(1),
(2), (4) Date: Aug. 31, 2005

(87) PCT Pub. No.: WO2005/104686

PCT Pub. Date: Nov. 10, 2005

(65) Prior Publication Data

US 2006/0265446 A1    Nov. 23, 2006

Related U.S. Application Data

(60) Provisional application No. 60/562,335, filed on Apr. 14, 2004.

(51) Int. Cl.
 G06F 15/16  (2006.01)
 G06F 7/04  (2006.01)
(52) U.S. Cl. .......................................... 709/203; 726/4
(58) Field of Classification Search ................. 709/225, 709/203, 229, 219; 713/168; 726/27, 3, 726/4; 717/111
See application file for complete search history.

(56) References Cited

U.S. PATENT DOCUMENTS

| 5,365,589 | A | 11/1994 | Gutowitz |
| 5,717,756 | A | 2/1998 | Coleman |
| 6,672,505 | B1 * | 1/2004 | Steinmetz et al. ........... 235/379 |
| 6,802,006 | B1 | 10/2004 | Bodrov |
| 6,823,391 | B1 | 11/2004 | Deen et al. |
| 6,823,464 | B2 | 11/2004 | Cromer et al. |
| 7,236,958 | B2 * | 6/2007 | Wong et al. ................... 705/59 |
| 7,290,149 | B2 * | 10/2007 | Alabraba et al. ............ 713/189 |
| 7,516,495 | B2 * | 4/2009 | Shoemaker et al. ........... 726/29 |

(Continued)

FOREIGN PATENT DOCUMENTS

FR    EP1339199 A1 *  8/2003

(Continued)

OTHER PUBLICATIONS

*SafeWord PremierAccess Authenticators*, Data Sheet, Secure Computing Corporation (May 2003) 2 p.

(Continued)

*Primary Examiner*—Nathan Flynn
*Assistant Examiner*—Chirag R Patel
(74) *Attorney, Agent, or Firm*—DeLizio Gilliam, PLLC

(57) ABSTRACT

A system to identify and/or authenticate an entity includes a client-side executable and an associated server-side executable, each of which may be dynamically generated. The server-side executable may be executed on a server to generate a first result. The client-side executable may be executed on an entity to generate a second result. The first result and the second result are compared to identify and/or to authenticate the entity.

24 Claims, 10 Drawing Sheets

U.S. PATENT DOCUMENTS

| | | |
|---|---|---|
| 2003/0033526 A1* | 2/2003 | French et al. ............... 713/168 |
| 2004/0083373 A1* | 4/2004 | Perkins et al. .............. 713/189 |
| 2004/0103291 A1 | 5/2004 | Craft |
| 2004/0123153 A1* | 6/2004 | Wright et al. ............... 713/201 |
| 2004/0193875 A1 | 9/2004 | Aura |
| 2005/0005098 A1 | 1/2005 | Michaelis et al. |
| 2005/0015601 A1 | 1/2005 | Tabi |
| 2005/0033991 A1 | 2/2005 | Crane |
| 2005/0039013 A1 | 2/2005 | Bajikar et al. |

FOREIGN PATENT DOCUMENTS

| | | |
|---|---|---|
| JP | 2003188873 | 7/2003 |
| WO | WO-0063855 | 10/2000 |
| WO | WO-03036412 | 5/2003 |
| WO | WO-03100629 | 12/2003 |
| WO | WO-2004082354 | 9/2004 |
| WO | WO-2005/104686 A2 | 11/2005 |
| WO | WO-2005104686 A3 | 11/2005 |

OTHER PUBLICATIONS

"International Search Report for corresponding PCT Application No. PCT/US05/12558", (May 10, 2007), 2 pgs.

"Written Opinion of the International Searching Authority for PCT Application No. PCT/US05/12558", (May 10, 2007), 7 pgs.

* cited by examiner

253

```
⇒ 004010CC    mov     esi, esp
  004010CE    push    0
  004010D0    push    0
  004010D2    push    0
  004010D4    lea     eax, [ebp-1Ch]
  004010D7    push    eax
  004010D8    call    dword ptr [ _imp_GetMessageA@16 (0042a350)]
  004010DE    cmp     esi, esp
  004010E0    call    _chkesp (00401710)
  004010E5    test    eax, eax
  004010E7    je      WinMain+0F0h (00401130)
44:                   {
45:                       if(!TranslateAccelerator(msg.hwnd, hAccelTable, &msg))
  004010E9    mov     esi, esp
  004010EB    lea     ecx, [ebp-1Ch]
  004010EE    push    ecx
  004010EF    mov     edx, dword ptr [ebp-20h]
  004010F2    push    edx
  004010F3    mov     eax, dword ptr [ebp-20h]
  004010F6    push    eax
  004010F7    call    dword ptr [ _imp_TranslateAcceleratorA@12 (0042a354) ]
  004010FD    cmp     esi, esp
  004010FF    call    _chkesp (00401710)
  00401104    test    eax, eax
  00401106    jne     WinMain+0EEh (0040112e)
46:                       {
47:                           TranslateMessage(&msg);
  00401108    mov     esi, esp
  0040110A    lea     ecx, [ebp-1Ch]
  0040110D    push    ecx
  0040110E    call    dword ptr [ _imp_TranslateMessage@4 (0042a358)]
  00401114    cmp     esi, esp
  00401116    call    _chkesp (00401710)
48:                           DispatchMessage(&msg);
  0040111B    mov     esi, esp
  0040111D    lea     edx, [ebp-1Ch]
  00401120    push    edx
  00401121    call    dword ptr [ _imp_DispatchMessageA@4 (0042a35c)]
```

| | | |
|---|---|---|
| 000000 | 4D 5A 90 00 03 00 00 00 | 04 00 00 00 FF FF 00 00 |
| 000010 | B8 00 00 00 00 00 00 00 | 40 00 00 00 00 00 00 00 |
| 000020 | 00 00 00 00 00 00 00 00 | 00 00 00 00 00 00 00 00 |
| 000030 | 00 00 00 00 00 00 00 00 | 00 00 00 00 D8 00 00 00 |
| 000040 | 0E 1F BA 0E 00 B4 09 CD | 21 B8 01 4C CD 21 54 68 |
| 000050 | 69 73 20 70 72 6F 67 72 | 61 6D 20 63 61 6E 6E 6F |
| 000060 | 74 20 62 65 20 72 75 6E | 20 69 6E 20 44 4F 53 20 |
| 000070 | 6D 6F 64 65 2E 0D 0D 0A | 24 00 00 00 00 00 00 00 |
| 000080 | 87 78 9C AB C3 19 F2 F8 | C3 19 F2 F8 C3 19 F2 F8 |
| 000090 | 40 05 FC F8 C6 19 F2 F8 | C3 19 F3 F8 A5 19 F2 F8 |
| 0000a0 | 9A 3A E1 F8 CE 19 F2 F8 | 2B 06 F8 F8 CB 19 F2 F8 |
| 0000b0 | 7B 1F F4 F8 C2 19 F2 F8 | 2B 06 F6 F8 C2 19 F2 F8 |
| 0000c0 | 52 69 63 68 C3 19 F2 F8 | 00 00 00 00 00 00 00 00 |
| 0000d0 | 00 00 00 00 00 00 00 00 | 50 45 00 00 4C 01 05 01 |
| 0000e0 | 1F BD FB 3B 00 00 00 00 | 00 00 00 00 E0 00 0F 0F |
| 0000f0 | 0B 01 06 00 00 50 00 00 | 00 A0 00 00 00 00 00 00 |
| 000100 | 30 39 00 00 00 10 00 00 | 00 60 00 00 00 00 40 40 |
| 000110 | 00 10 00 00 00 10 00 00 | 04 00 00 00 00 00 00 00 |
| 000120 | 04 00 00 00 00 00 00 00 | 00 C0 02 00 00 10 00 00 |
| 000130 | 0B C1 03 00 02 00 00 00 | 00 7D 00 00 00 10 00 00 |
| 000140 | 00 7D 00 00 00 10 00 00 | 00 00 00 00 10 00 00 00 |
| 000150 | 60 6A 00 00 32 00 60 60 | B4 61 00 00 8C 00 00 00 |
| 000160 | 00 90 00 00 F0 67 00 00 | 00 00 00 00 00 00 00 00 |
| 000170 | 00 B0 02 00 70 1A 00 00 | 00 00 00 00 00 00 00 00 |
| 000180 | 00 00 00 00 00 00 00 00 | 00 00 00 00 00 00 00 00 |
| 000190 | 00 00 00 00 00 00 00 00 | 00 00 00 00 00 00 00 00 |
| 0001a0 | 00 00 00 00 00 00 00 00 | 00 00 00 00 00 00 00 00 |
| 0001b0 | 00 60 00 00 A4 01 00 00 | 00 00 00 00 00 00 00 00 |
| 0001c0 | 00 00 00 00 00 00 00 00 | 00 00 00 00 00 00 00 00 |
| 0001d0 | 2E 74 65 78 74 00 00 00 | EA 48 00 00 00 10 00 00 |
| 0001e0 | 00 50 00 00 00 10 00 00 | 00 00 00 00 00 00 00 00 |
| 0001f0 | 00 00 00 00 20 00 00 60 | 2E 72 64 61 74 61 00 00 |
| 000200 | 92 0A 00 00 00 60 00 00 | 00 10 00 00 00 60 00 00 |
| 000210 | 00 00 00 00 00 00 00 00 | 00 00 00 00 40 00 00 40 |
| 000220 | 2E 64 61 74 61 00 00 00 | 55 19 00 00 00 70 00 00 |
| 000230 | 00 10 00 00 00 70 00 00 | 00 00 00 00 00 00 00 00 |
| 000240 | 00 00 00 00 40 00 00 C0 | 2E 72 73 72 63 00 00 00 |
| 000250 | F0 67 00 00 00 90 00 00 | 00 70 00 00 00 80 00 00 |
| 000260 | 00 00 00 00 00 00 00 00 | 00 00 00 00 40 00 00 40 |

252

```
MZ..............
........@.......
................
............Ø...
........!..L.!Th
is program canno
t be run in DOS
mode....$.......
.x..............
@...............
.........+......
{........+......
Rich............
........PE..L...
........P.......
09.............@.
................
................
.........}......
.}..............
`j..2....a......
.........g......
....p...........
................
................
................
.`..............
................
.text....H......
.P..............
....' ..rdata..
........@..@
.data...U....p..
....p...........
...@....rsrc....
.g.......p......
..........@..@
```

*FIG. 2C*

DYNAMIC EXECUTABLE

CLAIM OF PRIORITY

The present application is a U.S. National Stage Filing under 35 U.S.C. 371 from and claims priority of International Patent Application Number PCT/US2005/012558, filed Apr. 14, 2005, which claims the benefit under U.S. Provisional Application Ser. No. 60/562,335, filed Apr. 14, 2004, both of which are incorporated herein by reference.

FIELD

The disclosed subject matter relates generally to a method and system for authentication and authorized access control.

BACKGROUND

In computers, executables may be downloaded and installed onto a machine for the purpose of executing a set of instructions. One form of executable is a file that contains a program—that is, a particular kind of file that is capable of being executed. In this context, execution may refer to the process of running the program or performing an operation called for by an instruction contained therein. Thus, a computer processor may, for example, execute the instruction, meaning that it performs the operations called for by that instruction.

Executables may include a wide variety of computer programs, including, for example, application programs, such as spreadsheets and word processors. In a Disk Operating System (DOS) or Windows operating system, the executable may have, for example, a file name extension of .bat, .com, or .exe. Such executables may sometimes be referred to as binaries since the format of the executable includes a sequence of binary values.

Executables may also include, for example, an applet, which is a program designed to be executed from within another application residing, for example, on remote machine. Unlike an application, applets may be restricted from direct execution within the operating system. Applets may be mini-programs that are downloaded and used by any computer equipped, for example, with a Java-compatible browser. In this context, Java refers to the programming language designed primarily for writing software on World Wide Web sites and downloaded over the Internet to a personal computer (PC).

Executables may also include, for example, a Windows Programming Interface 32-bit subset, sometimes referred to as Win32s, which is a software package that may be added to Windows 3.1 and Windows for Workgroups systems to give them the ability to run 32-bit applications. In this regard, Win32s may be used to convert between 32-bit and 16-bit memory addresses, an operation called "thunking". When installing such an application on a 16-bit Windows system, the installation procedure may automatically install the Win32s system if necessary.

Executables that are not stored and executed in a tamper-proof environment may be reversed engineered, and may be used to obtain identification credentials. Moreover, executables such as an applet or Win32s may return structured information, whose form may be static and widely known. Accordingly, the executables may be susceptible to reverse engineering and therefore unsuitable for authentication and authorization.

Authentication typically includes the process of identifying an entity, for example based on a username and password. In security systems, authentication may be regarded as distinct from authorization, which is the process of giving an entity access to protected resources based on their identity. Accordingly, authentication may ensure that the entity is who it claims to be, while authorization may determine the access rights of the entity.

SUMMARY

An exemplary method and a system to identify and/or authenticate an entity is described. A client-side executable and an associated server-side executable is dynamically generated. The server-side executable is executed on a server to generate a first result. The client-side executable is executed on an entity to generate a second result. The first result and the second result are compared to identify and/or to authenticate the entity.

Other features will be apparent from the accompanying drawings and from the detailed description that follows.

BRIEF DESCRIPTION OF THE DRAWINGS

Embodiments of the present invention are illustrated by way of example and not limitation in the Figures of the accompanying drawings, in which like references indicate similar elements and in which:

FIG. 2B shows assembly language instructions of an executable, according to an example embodiment.

FIG. 2C shows representations in hexadecimal and ASCII form for 608 bytes of an executable, according to an example embodiment.

DETAILED DESCRIPTION

Embodiments describe a method and a system to identify and/or authenticate an entity. A client-side executable and an associated server-side executable may be dynamically generated. The server-side executable may be executed on a server to generate a first result. The client-side executable may be executed on an entity to generate a second result. The first result and the second result may be compared to identify and/or to authenticate the entity. The at least one instruction may include a collection instruction, and/or a processing instruction, which may include an encryption instruction. A limited time period may be imposed on the client-side executable to send the second result.

Platform Architecture

Figure 1A:
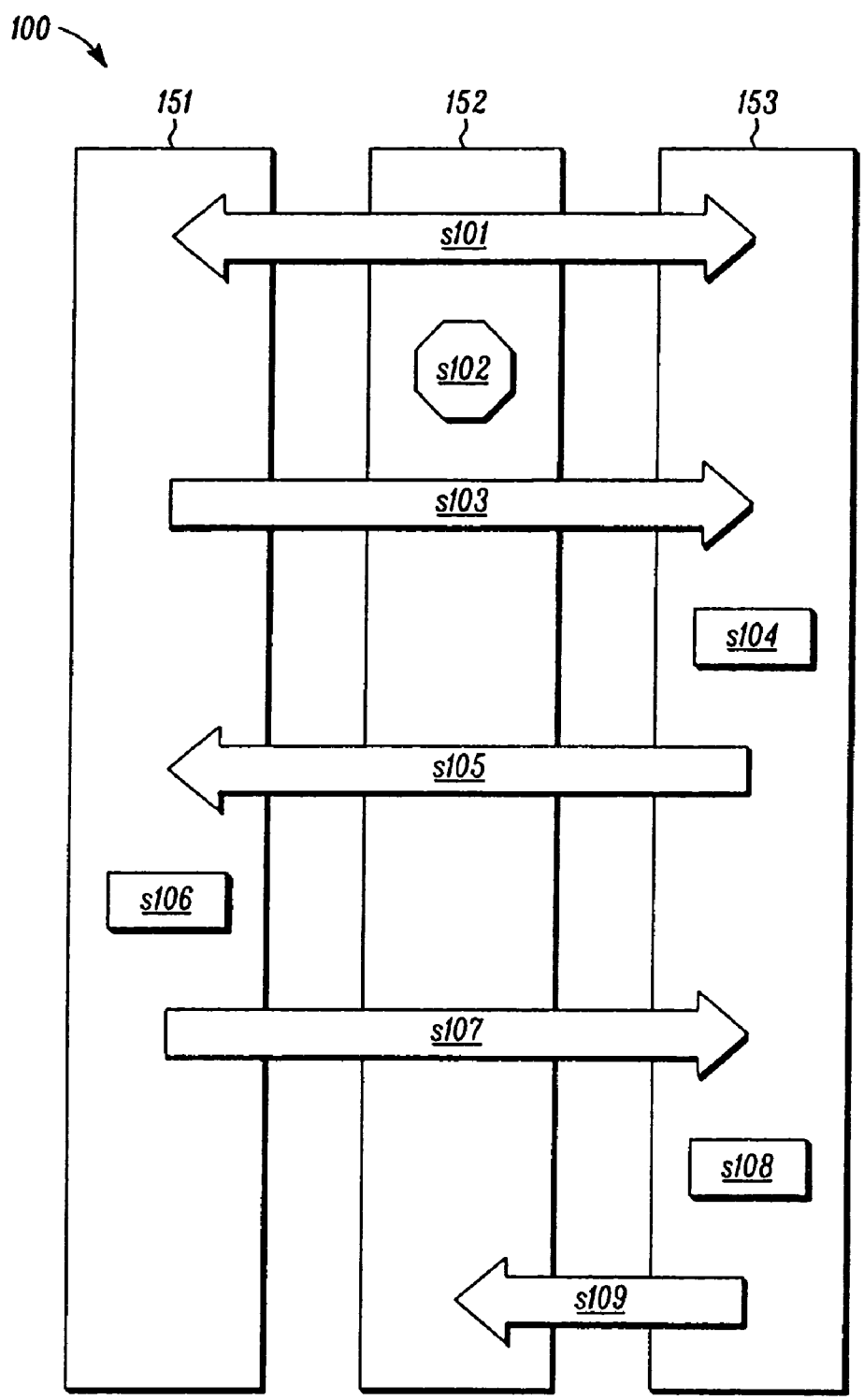
FIG. 1A shows a method and system to provide authentication and/or authorized access control of protected resources according to an example embodiment.

FIG. 1A shows an example method and system 100 to provide authentication and/or authorized access control of protected resources. The method and system 100 may be used, for example, to identify entities and better ensure that only "trusted" entities may access certain resources of a network or system. The access may include, for example, access to a web page, a wireless network, or an embedded application.

The example system 100 includes a client 151, an authenticator 152, and an authentication server 153. The client 151 may be an entity or application acting on behalf of the entity, which attempts access and/or requests authorization. The authenticator 152 provides an access point or proxy by which the client 151 may request access or authorization. The authentication server 153 provides an interface for data exchange with the access point. In this context, the client 151 may reside in a non-trusted environment, whereas the authenticator 152 and authentication server 153 may reside in a trusted environment. The authenticator 152 and authentication server 153 may be located on the same machine, or alternatively, the authenticator 152 and authentication server 153 may reside separately on different machines and/or different networks.

The client 151 may act on behalf of an entity to request authentication and/or access to protected resources. In this context, an entity, may be, for example, a machine, software-based application, or human, and may include, for example, a personal computer (PC), laptop, public terminal, handheld device, instance of a software program, or user(s) thereof. The client 151 may be implemented, for example, at least partially, via a Component Object Model (COM) object, which may be downloaded and installed via an electronic software distribution system or via the installation of a computer disc (CD). The client 151 may have, for example, administrative privileges on the resident machine.

The authenticator 152 may act as a gateway to facilitate an authentication session between the client 151 and the authentication server 153. In this regard, the authenticator 152 may initiate the authentication session on behalf of the requesting client 151, listen for an authentication result as determined the authentication server 153, and control access based on an authentication result. The authenticator 152 may be implemented, for example, as an edge device or edge switch, which is located at the edge of the network or system to be protected. The authenticator 152 may also be implemented, for example, at least partially as a web page. The authentication server 153 may validate information supplied by the client 151. In this regard, the authentication server 153 may access one or more databases, which store credential information regarding the entity.

Figure 1B:
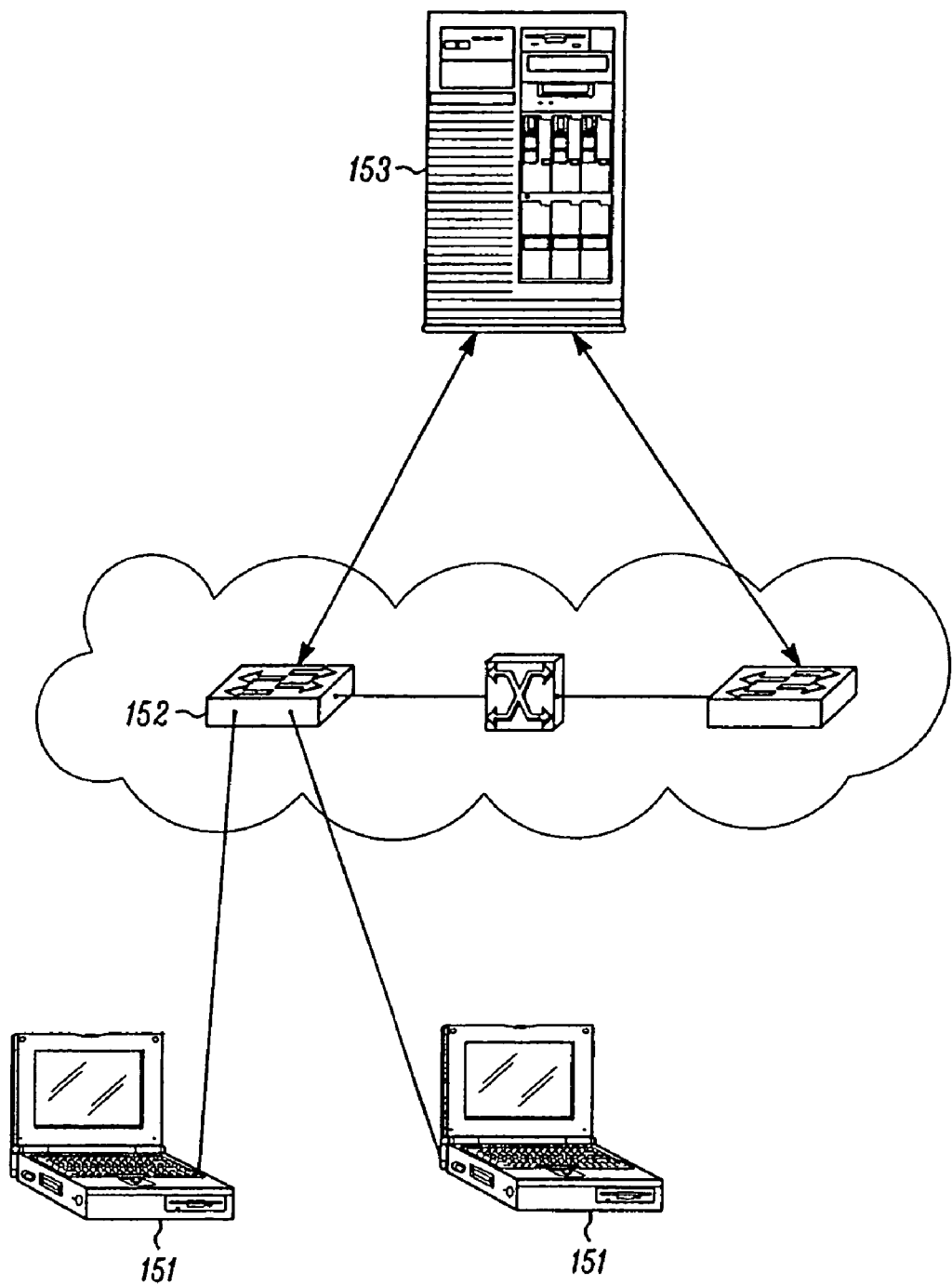
FIG. 1B shows an implementation for the system of FIG. 1A, according to an example embodiment.

FIG. 1B shows an example implementation of the client 151, authenticator 152, and authentication server 153 of FIG. 1A, based on the IEEE 802.1x standard for security of wireless local area networks (WLANS). The 802.1x standard provides an authentication framework that allows one or more entities to be authenticated by a central authority. The actual algorithm that is used to determine whether an entity is authentic is left open and multiple algorithms may be provided.

The 802.1x standard uses the Extensible Authentication Protocol (EAP), as defined in Request for Comment (RFC) 2284 published by the Internet Engineering Task Force (IETF), to exchange messages related to the authentication process during the link establishment phase. The authenticator 152 and authentication server 153 may further communicate using the Remote Authentication Dial-In User Service (RADIUS) as defined in IETF RFC 2139 and 2865 to validate information, sometimes referred to as credentials verification. It will be appreciated that other protocols may be suitable to exchange messages between the client 151, authenticator 152, and authentication server 153.

FIG. 1A also shows an example method to provide authentication and/or authorized access, which demonstrate example interactions between the client 151, authenticator 152, and/or authentication server 153.

In block s101, a session is established and an authentication request is made on behalf of the entity requesting access. In this regard, the authentication may be requested for continued access as long as the session is active. Alternatively, the authentication may be provided, for example, on a one-time basis for each requested access. The request for access may include, for example, a request to participate in an Ethernet network, create a virtual private network (VPN), or launch an embedded application.

In block s102, access is denied. Access may be denied, for example, if a reported machine id does not match a corresponding stored machine id, or an irregularity is detected, for example, with respect to an element or aspect of client software, hardware or firmware.

In block s103, a client id is communicated from the client 151 to the authentication server 153. The client id is a logical identifier that may be used, for example, to provide so-called real cardinal machine identification, that is, an association between information collected and a client, despite the changing nature of which and how information is collected. Thus, for example, although the type of information collected may change, the client id should remain the same. The client id may be selected, for example, to optimize indexing during the validation of hardware signatures.

In block s104, one or more executables may be dynamically created, or alternatively, the executables may have been created in advance and selected as a subset from the executables created for each use. The executables may include, for example, a pair of executables—a client-side executable and a server-side executable. The client-side executable is intended to collect information regarding an entity or resource(s) associated with the client, and the server-side executable is intended to validate the information collected by performing identical or at least similar operations using information previously stored about the entity or associated resource(s). In this regard, the information may be stored, for example, using the Lightweight Directory Access Protocol (LDAP) as defined in IETF RFC 2251, or any other suitable database protocol.

The client-side executable may be created dynamically by selecting a subset of verification functions. The server may include a mapping of verification functions.

The information collected by the client-side executable may include, for example, low-level information regarding the entity's machine or operating system, sometimes referred to as cardinal information. For example, the executable may include COM object or a dynamic link library (DLL) operation to collect hardware information. DLL is a feature of OS/2 and Windows, which allows executable code modules to be loaded on demand and linked at run time.

The executable may also include, for example, a JavaScript or VBScript program, which may collect machine and browser properties. JavaScript and VBScript (Virtual Basic Script) are interpreted languages, which are evaluated during runtime.

The executable may also include, for example, a device driver to scan the entity's machine and return its hardware signature, based on the devices found. In particular, a hardware signature may be generated using information collected from, for example, a central processing unit (CPU), a Desktop Management Interface (DMI), Integrated Drive Electronics (IDE), an AT Attachment Packet Interface (ATAPI), and a Small Computer System Interface (SCSI).

The client-side and server-side executables may also be configured so that the collected information is obfuscated in a manner that is unique to each created pair. For example, if several pairs of executables were created for a given entity, each created pair may be configured to return a different result—even though the information used to identity has not changed.

The dynamic elements used to obfuscate the information collected or retrieved by the dynamic executables may include, for example, functions, implementation, workflow, encryption algorithms, communications protocols, or any combination thereof.

The dynamic executables may be created, for example, on the authentication server 153, or alternatively on a different server and a subset may be randomly selected therefrom for each use.

In block s105, the client-side executable is sent to the client 151. The client-side executable may be sent, for example, over a secure encrypted channel. In particular, Rivest-Shamir-Adleman (RSA) and Data Encryption Standard (DES) encryption technology may be employed and encryption keys may change several times. Other encryption technologies may be used as well. The sending of the client-side executable may serve as the "challenge" in a "challenge/response". A "challenge/response" may be regarded as a type of authentication/authorization procedure, in which a correct response to the challenge is required to confirm an identity or to gain access. In the context of authenticating a hardware component, the challenge may be referred to as a machine hardware challenge (MHC).

In block s106, the client-side executable collects entity information, which may be gathered from or computed by using various hardware and/or software components of the client 151. The collected information may be processed, for example, hashed and/or digested using the Message Digest version 5 algorithm (MD5). As defined in IETF RFC 1321, MD5 is an algorithm (a.k.a., a one-way hash function), which takes an input message of arbitrary length, and produces a fixed-length output in the form of a 128-bit digital signature, sometimes referred to as a "fingerprint" or "message digest". It will be appreciated that algorithms other than MD5 may be used to process and/or hash the collected information.

The MD5 operation may be performed independently on information collected separately for each resource component, resulting in multiple individual digital signatures. Depending upon the instruction set of the particular instance of client-side executable, the information may undergo other mathematical manipulations to further obfuscate their representation. The digital signatures may also be concatenated together and/or their bytes transposed into a different order.

The MD5 operation may be performed on information collected from any type of resource component of the client, including both hardware and software components. If, for example, the MD5 operation is performed on information collected from a hardware component, the resulting digital signature may be referred to as a "device signature". In this regard, each device signature may be prefixed with a 4-byte identifier of the device type, which together may be collectively referred to as the "device block". Device blocks may undergo additional mathematical manipulations as instructed by a particular instance of the executable to further obfuscate their representation. The obfuscated device blocks may be concatenated together and each byte may be transposed into a different ordering.

In block s107, the information collected by the client-side executable, having been processed, such as hashed, obfuscated, and/or transposed, is sent to the authentication server 153, thereby serving as a "response" to the previously sent challenge. A secure channel may be used for communication.

The particular communications channel and protocol used to communicate the information may be specified by the client-side executable as well. For example, the client-side executable may include instructions to use a particular communication port and/or a particular communication protocol.

In block s108, the information sent by the client 151 is compared with information generated by the server-side executable. In particular, the bytes of received information may be "un-transposed" to their original consecutive order, the mathematical manipulations previously performed by the client-side executable reversed, and the results compared with results of the operations performed by the server-side code on the previously stored information for the entity.

In block s109, the requested access is permitted or denied depending, for example, on whether or not the information collected by the client-side executable is returned to the authentication server 153 with a predefined time period as measured from the time that the client-side executable was sent to the client 151, and whether such return information compares favorably with that which is generated by the server-side executable. For example, access may be permitted if the information is returned within the predefined time period (e.g., 50 milliseconds) and the results of the comparison properly match. Otherwise, access may be denied, for example, if the information is returned after the predefined time period (e.g., more than 50 milliseconds later) or the client-side and server-side executable produce different results. To this end, the authenticator 152 may include an expiration indicator to render the entity as not identified if the client-side generated result is not received by the authenticator 152 during a limited time frame.

Flowchart

Figure 2A:
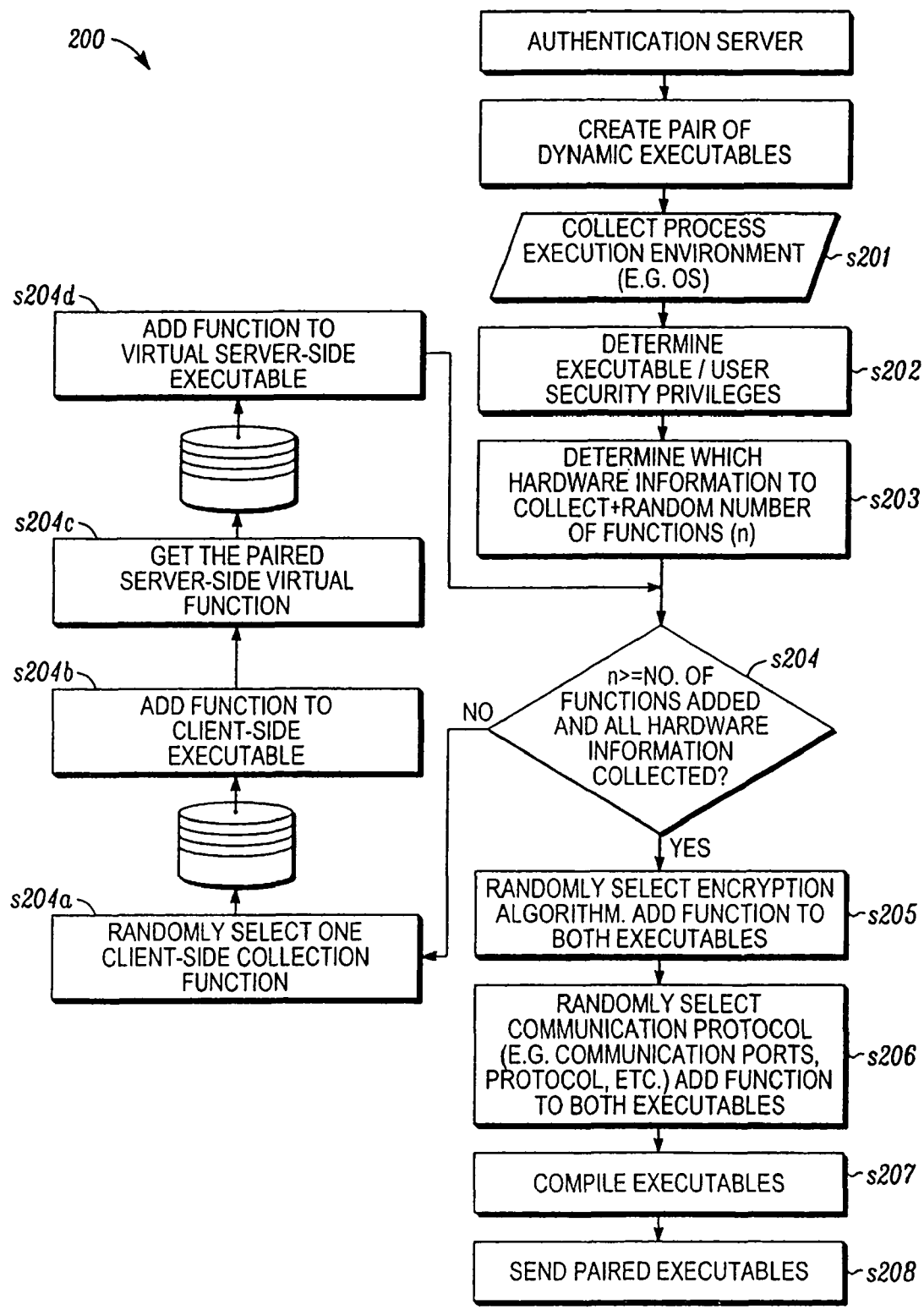
FIG. 2A shows a method to dynamically create a virtual pair of executables, according to an example embodiment.

FIG. 2A shows an example method 200 to dynamically create a virtual pair of executables. In this regard, the request to create the executables may originate, for example, within the authentication server 152 as described in connection with FIG. 1A.

In block s201, information regarding an execution environment of the executable is collected. The information may include, for example, an operating system type, such as the Unix or Windows operating systems, a CPU characteristic, such as 32-bit or 64-bit microprocessor, or a device type, such as, a portable handheld device or stationary network node. The information may be collected, for example, by challenging the client or by challenging the associated agent, who then may respond with the appropriate information regarding the execution environment.

In block s202, executable/user security privileges are determined so that an appropriate instruction set may be constructed which is capable of valid execution in the target environment. In this context, security privileges may refer to, for example, permitted actions or access rights with respect to a particular system resource, such as a hardware device, directory, file, or program.

In block s203, the particular hardware information and number of randomly selected functions is determined. In this regard, the hardware information may include, for example, information related to a hard drive or Compact Disc—Read Only Memory (CD-ROM), or any other device information available via an appropriate interface, including, for example, information available via a Desktop Management Interface (DMI) or a Small Computer System Interface (SCSI). The randomly selected functions may be determined, for example, to be several different functions to collect a specific hardware serial number three times.

In blocks s204a and s204b, a client-side collection function is randomly selected and added to the client-side executable. In this context, the client-side collection function and client-side executable are intended for performance and execution in a non-trusted environment, sometimes also referred to as a hostile environment.

In blocks s204c and s204d, a paired server-side virtual function is obtained and added to the server-side virtual executable. In this context, the server-side virtual function and server-side virtual executable are intended for performance and execution in a secure environment in order to "simulate" the performance and execution of the client-side collection function and client-side executable.

At block s204, blocks s204a through s204d may be repeatedly performed until the appropriate number of functions is added for all hardware information intended to be collected, as previously determined in block s203.

In block s205, a processing algorithm, such as an encryption algorithm, may be randomly selected and added to both executables. In this regard, the selected algorithm may be symmetric or non-symmetric, including, for example, such encryption algorithms as Rivest-Shamir-Adleman (RSA) and Data Encryption Standard (DES). The encryption key size may be varied as well.

In block s206, a communication protocol is randomly selected and associated with each executable. The communication protocol may specify, for example, a specific transport layer, such as the Transmission Control Protocol (TCP) or the User Datagram Protocol (UDP). The communication protocol may also specify, for example, a specific communications port.

In block s207, the executables are compiled. In this context, "compile" may refer, for example, to the act of translating the instructions of the executable into machine or object code. "Compile" may also refer, for example, to a mere adjustment of the executable in order to conform to the target environment or ensure its valid execution therein.

In block s208, the executables are sent. In this regard, one executable may be sent to the client and the other executable may be sent to the authentication server. The executables may be sent, for example, via a Secure Socket Layer (SSL) channel or proprietary Transmission Control Protocol/Internet Protocol (TCP/IP).

Data Structures

FIG. 2B shows example assembly language instructions 253 of an executable. It will be appreciated that the instructions of an executable may be provided in a variety of computer languages.

FIG. 2C shows example representations for 608 bytes of an executable. The example representations include an example hexadecimal (base-16) representation 251 and an American Standard Code for Information Interchange (ASCII) character representation 252. It will be appreciated that an executable may be provided in any suitable format to accommodate a wide variety of processing environments.

Figure 3A:
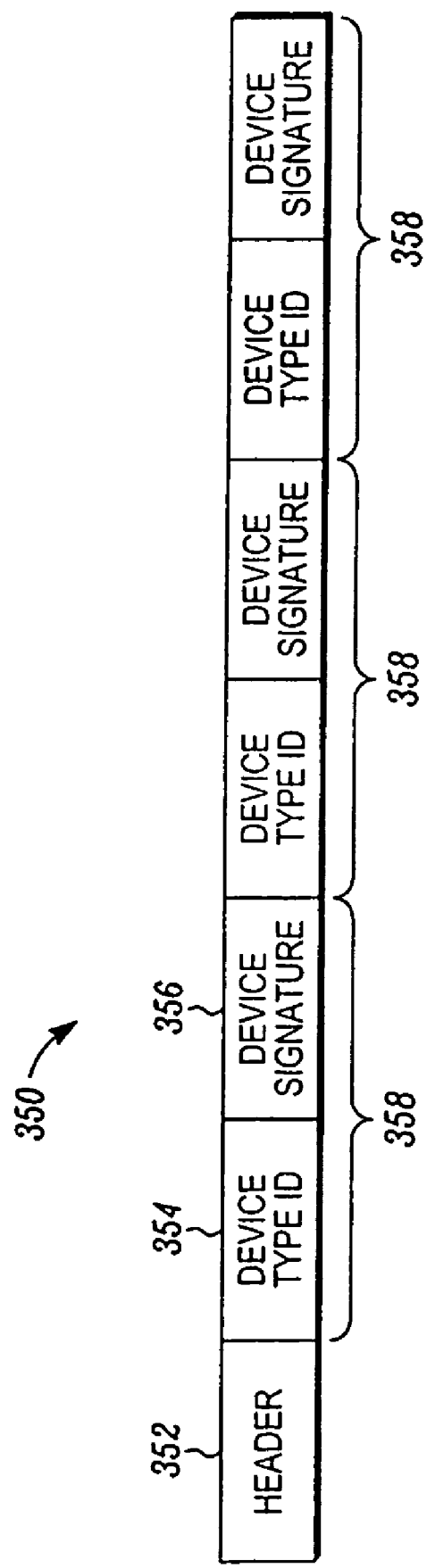
FIG. 3A shows an illustration of hardware signature components according to an example embodiment.

FIG. 3A shows an example representation of components of a hardware signature 350. In this regard, the hardware signature 350 may include a header 352, which specifies the version of the hardware signature 350, and a quantity of device blocks 358 contained in the hardware signature 350. In this context, the hardware signature version may refer to a particular format of the hardware signature 350, and the device block may refer to a combined representation of the device signature 356 and corresponding device type 354.

Flow Chart(s)

Figure 3B:
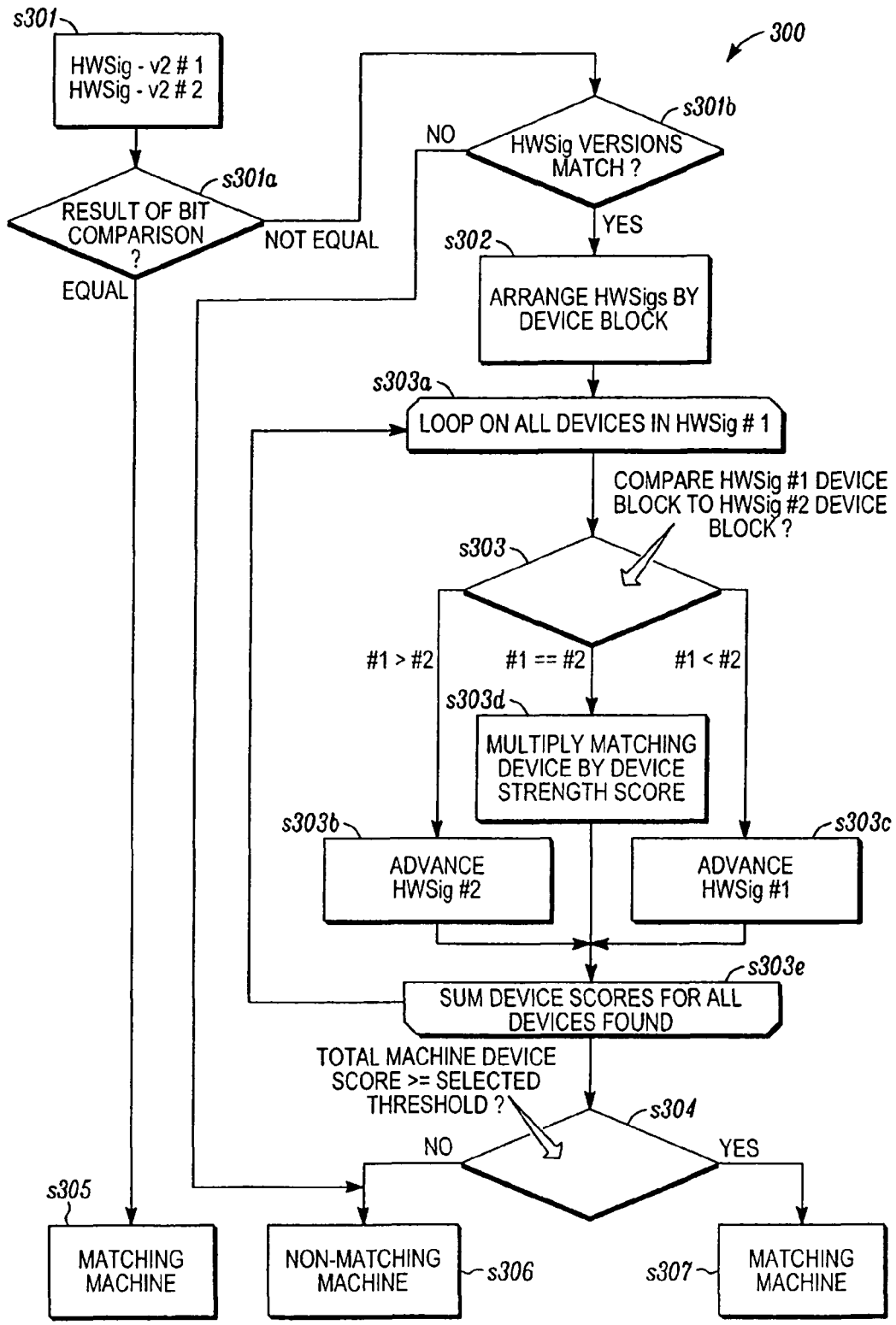
FIG. 3B shows a method to perform a hardware signature comparison, according to an example embodiment.

FIG. 3B shows an example method 300 to perform a hardware signature comparison. In this context, a hardware signature may be, for example, a combination of all device signatures associated with a particular entity. The device signature may be, for example, a hash of information identifying a particular device.

In block s301, hardware signature HWSig #1 is compared to hardware signature HWSig #2. The HWSig #1 may refer to the hardware signature associated with the client machine image previously saved on the server at a time when the client machine may have been previously been matched and/or authenticated. HWSig #2 may refer to a hardware signature based on currently collected information from the client machine.

At block s301a, the process queries whether hardware signature HWSig #1 is equal to hardware signature HWSig #2, and if so, then a matching machine may be assumed at block 305. If hardware signature HWSig #1 is not equal to hardware signature HWSig #2, then the hardware signature versions are compared at block s301b. If the hardware signature versions do not match at all, then a non-matching machine may be assumed at block s306. Otherwise, if the hardware signature versions match at least partially, then in block s302 the hardware signatures are arranged by device block. In this context, arranging the hardware signatures by device block may refer, for example, to dividing the hardware signatures into known device blocks as anticipated by a particular version of the hardware signature.

At times hardware components may change due to, for example, failures or swapping of components. For instance, a particular internal CD-ROM may be swapped or exchanged for a newer model. To accommodate such changes in hardware components, a threshold level of matching hardware signature components may be specified rather than requiring an absolute match. In particular, the threshold may be a numerical score, which is obtained by classifying devices based on their ability to provide positive or strongly identifying characteristics. For example, a CPU identifier may be classified as a relatively strong identifier and accordingly assigned a relatively high score, whereas a hard drive with no serial number may be classified as a relatively weak identifier and accordingly assigned a relative low score. Hence, the devices may be associated with a score that reflects how strongly the devices act as identifiers relative to other devices.

At block s303, and in blocks s303a through s303e, a device block by device block comparison is performed for each and every hardware signature device block, and a total machine device score is computed at block 303e. In particular, for each device block of hardware signature HWSig #1, a comparison is made with all device blocks of hardware signature HWSig #2. If the current device block of hardware signature HWSig #1 is greater than the current device block of hardware signature HWSig #2 (e.g., there are more devices identified in HW Sig #1 than in HW Sig #2), then in block s303b the hardware signature HWSig #2 is advanced. When the hardware signature HWSig #2 is advanced, extra devices identified in HWSig #1 are not considered and are taken out of the comparison (e.g., not scored). If information regarding a specific device is not collected anymore, then that device is not considered or scored. For example, there may be a known way to exchange or adjust identification information on a network card. Matching may not be based upon this network card, and this network card may not be scored.

Else, if the current device block of hardware signature HWSig #1 is less than the current device block of hardware signature HWSig #2 (e.g., there are more devices identified in HW Sig #2 than in HW Sig #1), then in block s303c the hardware signature HWSig #1 is advanced. That is, the extra devices identified in HW Sig #2 are not considered and not scored. In an example, the extra device(s) of HW Sig #2 may not be used, but may be saved on the server. The HW Sig #2 image may be updated on the server as discussed in regard to FIG. 5.

Otherwise, if the current device block of hardware signature HWSig #1 equals the current device block of hardware signature HWSig #2, then in block s303d the matching device is multiplied by a device strength score. For example, a CPU ID is something that the user is unlikely to change, because the CPU is unlikely to change. Accordingly, a CPU ID that matches may be given a relatively high score. However, for a hard drive and/or a CD-ROM, they may need to be replaced, and may correspondingly have a lower score.

In block S303e, the device scores are summed or added for all devices found. Thereafter, the method 300 returns to block s303a until each device identified in HWSig #1 is compared, and an associated score is calculated.

If, after comparing all devices of the hardware signature HWSig #1 at block s304, the total machine device score is greater than or equal to the selected threshold, then a matching machine may be assumed at block s307. Otherwise, if the total machine device score is less than the selected threshold, then a non-matching machine may be assumed at block s306.

It will be appreciated that the example method 300 to perform a hardware signature comparison demonstrates a dynamic aspect that may, in addition to randomly selecting functions, provide a flexible approach to add functions on a continuing basis.

Figure 4:
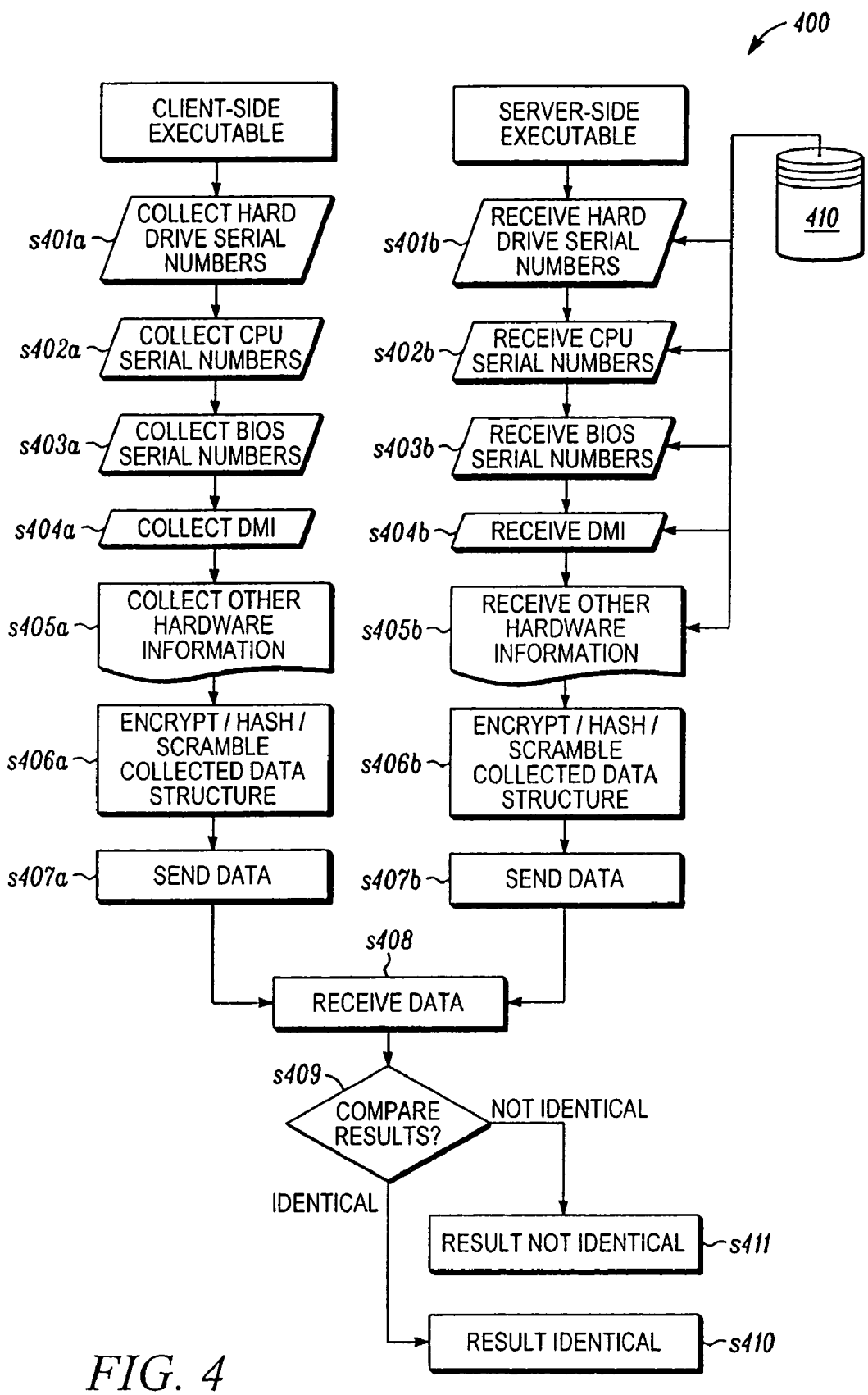
FIG. 4 shows a method to compare obfuscated information in client-side and server-side executables, according to an example embodiment.

FIG. 4 shows an example method 400 to compare obfuscated information in client-side and server-side executable pairs.

In block s401a through s405a, hard drive serial numbers, CPU serial numbers, Basic Input/Output System (BIOS) serial numbers, Desktop Management Interface (DMI) particulars, and other hardware information is collected for the client-side executable.

In block s401b through s405b, hard drive serial numbers, CPU serial numbers, BIOS serial numbers, DMI particulars, and other hardware information is received for the server-side executable from a database 410. It will be appreciated that the database 410 may be local or remote, or may be obtained, for example, from an encrypted image resident on any machine, including, the client, authentication server, or third-party machine.

In block s406a, the hardware information collected on behalf of the client-side executable is processed, for example: encrypted, hashed, and/or scrambled in an appropriate manner.

In block s406b, the hardware information received on behalf of the server-side executable is processed, for example: encrypted, hashed, and/or scrambled in an appropriate manner.

In blocks s407a and s407b, the processed (e.g., encrypted, hashed, and/or scrambled) data is sent to an appropriate application for comparison, such as, for example, an authentication server, which may reside, for example, locally or remotely, and may be provided, for example, by a third party.

In block s408, the processed (encrypted, hashed, and/or scrambled) data is received and the results are compared to determine if they match. Block s408 may occur within the authenticator 152.

At block s409, the results (e.g., the data from the client-side and the data from server-side) may be compared. If the results are identical, the method 400 proceeds to block s410. If the results are not identical, the method 400 proceeds to block s411.

Figure 5:
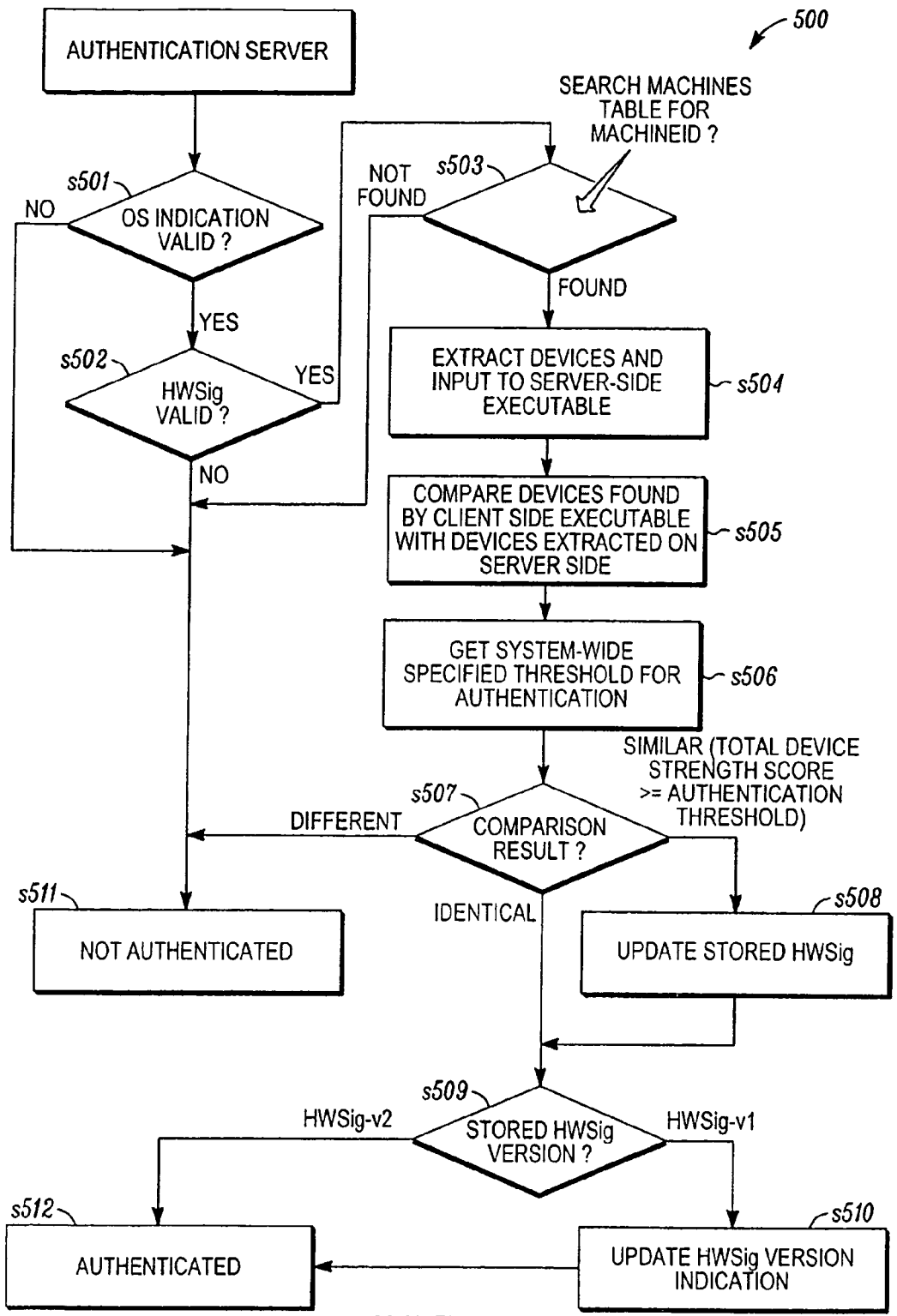
FIG. 5 shows an authentication method using a pass/fail threshold level, according to an example embodiment.

FIG. 5 shows an example method 500 for authentication of a client by, for example, the authentication server 153 using a pass/fail threshold level. In this regard, the example method may use, for example, a virtual pair of executables, which may include, for example, a client-side executable and a server-side executable.

In block s501, the method 500 queries whether an execution environment indication returned by the client-side executable is validated. In this regard, the execution environment indication may include, for example, an indication of a particular operating system. If the execution environment indication is invalid, the client is deemed not authenticated and the method 500 proceeds to block s511. Otherwise, if the execution environment indication is valid, the example method 500 proceeds to block s502.

In block s502, the method 500 queries whether the hardware signature HWSig returned by the client-side executable is validated. In this regard, the hardware signature may be validated, for example, for a proper version and/or format. The hardware signature HWSig may also be validated for proper size, including, for example, a proper header size or proper device block size. If the hardware signature HWSig is found to be invalid, then the client is deemed not authenticated and the method 500 proceeds to block s511. Otherwise, if the hardware signature HWSig is valid, then the example method 500 proceeds to block s503.

In block s503, an attempt is made to find a matching machine id. In this regard, a table of machine ids may be maintained. The table of machine ids may be maintained, for example, in a database. The database may be, for example, local or remote. If a matching machine id is not found, then the client is not authenticated and the method 500 proceeds to block s511. Otherwise, if a matching machine id is found, then the example method proceeds to block s504.

In block s504, information required for the server-side executable is extracted and inputted to the server-side executable. In this regard, the extracted information may include, for example, one or more devices previously known to be associated with the client.

In block s505, the information extracted and input to the server-side executable is compared with information found by the client-side executable. In this regard, the information found by the client-side executable may include, for example, one or more devices associated with the client.

In block s506, a system-wide threshold for authentication is obtained. In this regard, the authentication threshold may be, for example, a hardware-related and/or software-related threshold.

In block s507, if the system is configured for identical authentication and the information found by the client-side executable and the information extracted and input to the server-side executable are non-matching as defined by the threshold, then the client is deemed not authenticated and the method 500 proceeds to block s511. Else, if the information found by the client-side executable is identical, the example method 500 proceeds to block s509.

Alternatively in block s507, if the system is configured for threshold authentication then if the information found by the client-side executable is similar to the information extracted and input to the server-side executable, as defined by a computed strength score equaling or exceeding the authentication threshold, then the example method 500 proceeds to block s508. For example, the threshold score may be set at 80% of identical.

In block s508, the stored hardware signature HWSig is updated in the server with information related to new device(s) of the client machine. In this regard, the update may include, for example, an update of one or more hardware signature components, including, for example, one or more device blocks or contents thereof. The server side image of the client machine may be updated at block s508. The example method 500 then proceeds to block s509.

In block s509, the stored hardware signature is examined to determine a particular hardware signature version. In this regard, the stored hardware signature version may be, for example, a hardware signature version 1 (HWSig-v1) or a hardware signature version 2 (HWSig-v2).

If, for example, the stored hardware signature version is not the latest version, e.g., hardware signature version 1 (HWSig-v1), then the example method 500 proceeds to block s510.

Otherwise, if the stored hardware signature version is the latest version, e.g., hardware signature version 2 (HWSig-v2), then the client is deemed authenticated and the method 500 proceeds to block s512.

In block s510, the stored hardware signature version of the client machine is updated at the server side to reflect the new version and the client is deemed authenticated and the method 500 proceeds to block s512. In this regard, the stored hardware signature version may be updated, for example, from hardware signature version 1 HWSig-v1 to hardware signature version 2 HWSig-v2.

Embodiments may provide a system and method to collect information from an entity in a secure manner so that the identity of the entity may be authenticated and/or access to certain protected resources by the entity may be authorized. The collected information may include, for example, hardware and/or software-related information regarding the entity or resources associated with the entity.

According to an example embodiment of the present invention, the information may be collected via a virtual pair of executables. In this context, a virtual pair may include two executables: one executable to collect information about an entity and the other executable to compare the collected information with information previously stored for the entity. In this regard, each executable may include a set of instructions intended to be executed in a suitable processing environment.

The executables may be created dynamically, that is, "on the fly," to prevent reverse engineering. Alternatively, one executable may be static, created only once to include, for example, all potential functions, while the second executable may be created dynamically by selecting a subset of all potential functions. In this regard, the dynamically created executable may perform the functions in a non-trusted environment (sometimes referred to as a hostile environment) while a mapping of selected functions may be retained on a server in the trusted environment.

The type, order, and/or amount of information, or the method of collecting and sending the information, may be determined in a dynamic manner as well. For example, a first pair of executables may concern the collection of a central processing unit (CPU) id and a hard drive serial number obtained from a registry, whereas a second pair of executables may concern the collection of only the hard drive serial number as obtained not by the registry but by accessing the device at the lowest level over a certain port. Consequently, the information returned by a particular executable pair may be unique, or at least unlikely to be duplicated by another pair of executables.

According to an example embodiment, the virtual pair of executables may be configured to return an identical, or at least similar, result for a common set of dynamically-created functions so that the collected information may be verified despite the collection occurring, for example, in a so-called non-trusted or hostile environment. A limited amount of time may be imposed to collect and return the information so that, if the information is not returned prior to this stipulated time, the information may be deemed unreliable and appropriately disregarded, For example, if information is not collected and returned within 50 milliseconds, any information returned thereafter is considered suspect and may be accordingly disregarded. Hence, by dynamically creating the executable and imposing a time limit to return collected information, the time available to perform reverse engineering may be effectively limited.

According to an example embodiment, an executable may be configured to return a hash. In this context, the hash (also referred to as a message digest) is a value generated from the collected information. The hash may be substantially smaller than the collected information itself, and may be generated by a formula in such a manner that it is unlikely that some other collected information will produce the same hash value.

The executable may also be configured to return a one-way hash, which is an algorithm or function that "turns" the collected information into a fixed-length value. As with other hash types, it may be nearly impossible to derive the original collected information from only the one-way hash value.

A one-way hash function may be used to create digital signatures, which is a digital code that may be used to uniquely identify the sender. Like a written signature, the purpose of a digital signature is to ensure that the individual sending the information really is who he or she claims to be. There are a number of different encryption techniques to provide this level of security.

The information collected by an executable may also be obfuscated, that is, the information collected for the purposes of authentication or authorization may be rendered more difficult to perceive to third parties (e.g., would-be listeners). Hence, if several pairs are sent to identify a given entity, each pair may return a different answer—even though the entity's identifying information has not changed. The elements used to obfuscate the information in the pair of executables may include, for example, functions, implementation, workflow. Other elements used during the challenge/response may include, for example, the dynamic selection of an encryption algorithm and/or communication protocol.

Embodiments may also provide authentication despite a configuration change, including, for example, hardware changes. At times the hardware may require change due to, for example, a failure or a desire to swap components. For example, an internal CD-ROM drive may fail or a faster model may be desired. To accommodate the change, a threshold level of pass/fail authentication may be provided, which is configurable. In this regard, a level of identification strength may be specified for each hardware component so that the presence of certain hardware components (e.g., CPU) may provide a stronger basis for identification of an entity as compared to other hardware components (e.g., CD-ROM drive). Accordingly, limited changes in hardware may be flexibly accommodated by setting the threshold to an appropriate value (e.g., a required match of at least one strongly identifying hardware component or a required match of at least three weaker identifiers), whereas if an absolute match of hardware components is required the threshold level may be set to the highest level (e.g., 100% match of all hardware component identifiers). If during an authentication attempt, the specified threshold level is met, the hardware signature used to validate the identity of the requesting entity may be automatically updated to include the signatures of any newly configured components. If, however, during the authentication attempt, the specified threshold level is not met, it may be assumed that the requesting entity is not properly identified and therefore refused access.

Embodiments may also provide the ability to deny authentication. For example, authentication may be denied upon the detection of an unauthorized device (e.g., wireless local area network (LAN) card or a Universal Serial Bus (USB) key) or the presence of unauthorized software (e.g., virtual machine). Moreover, authentication may be denied despite identical or matching hardware and/or software identifiers. For example, authentication may be denied even if there is a 100% match of all hardware and software component identifiers.

In the following description, for purposes of explanation, numerous specific details are set forth in order to provide a thorough understanding of embodiments of the present invention. It will be evident, however, to one skilled in the art that embodiments of the present invention may be practiced without these specific details.

Computer System

Figure 6:
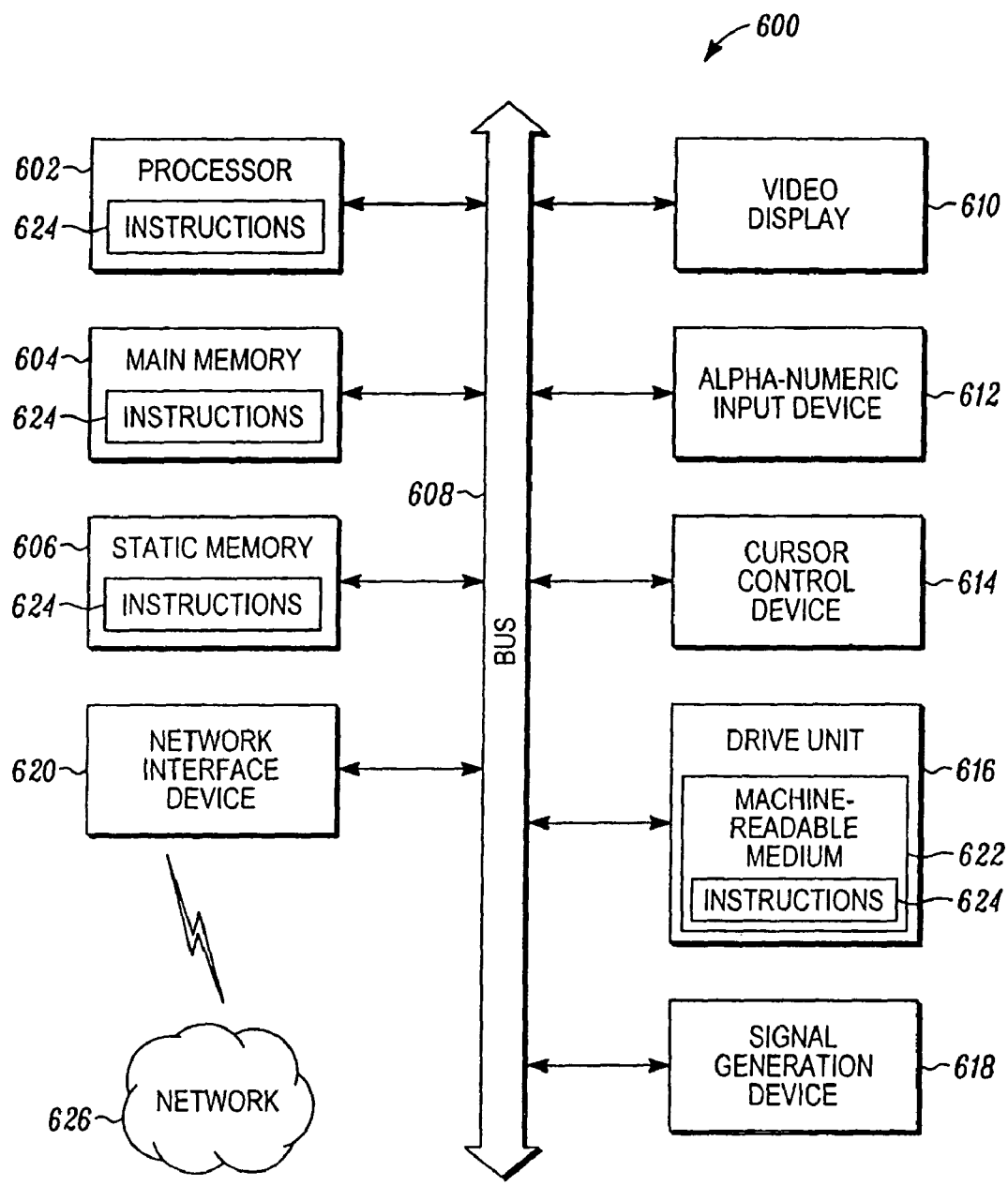
FIG. 6 illustrates a diagrammatic representation of a machine in the form of a computer system within which a set of instructions, for causing the machine to perform any one or more of the methodologies discussed herein, may be executed, according to an example embodiment.

FIG. 6 shows a diagrammatic representation of a machine in the example form of a computer system within which a set of instructions, for causing the machine to perform any one or more of the methodologies discussed herein, may be executed. In alternative embodiments, the machine operates as a standalone device or may be connected (e.g., network) to other machines. In a network deployment, the machine may operate in the capacity of a server or a client user machine in server-client user network environment, or as a peer machine in a peer-to-peer (or distributed) network environment. The machine may be a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The instructions 624 may also reside, completely or at least partially, within the main memory 604, the static memory 606, and/or within the processor 602 during execution thereof by the computer system 600. The main memory 604 and the processor 602 also may constitute machine-readable media.

The instructions 624 may further be transmitted or received over a network 626 via the network interface device 620.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. FIGS. 1 to 6 are merely representational and may not be drawn to scale. Certain proportions thereof may be exaggerated, while others may be minimized. Accordingly, the specification and drawings are to be regarded in an illustrative rather than a restrictive sense.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, embodiments describe a method and a system to identify and/or authenticate an entity. Although embodiments of the present invention have been described with reference to specific example embodiments, it will be evident that various modifications and changes may be made to these embodiments without departing from the broader spirit and scope of embodiments as expressed in the subjoined claims.

What is claimed is:

1. A system comprising:
one or more processors
a server-side executable by one or more processors and configured to gather information about an execution environment of a client-side machine; and execute on a server to generate a first hardware signature including information identifying devices of the client-side machine;
a client-side executable by one or more processors and configured to execute on the client-side machine, to generate a second hardware signature identifying on devices associated with the client-side machine, the client-side executable being dynamically generated on the server and securely downloaded to the client-side machine, the client-side executable being associated with the server-side executable and configured to operate in the execution environment of the client-side machine, and configured to execute a subset of instructions from the server; and
an authenticator to configured to compare the first hardware signature and the second hardware signature based on a threshold level of matching to identity of the client-side machine.

2. The system of claim 1 wherein the server includes the authenticator.

3. The system of claim 1 wherein the server and the authenticator are separate.

4. The system of claim 1 further comprising a server-side database accessible by the server-side executable, wherein the server-side database includes the information identifying devices of the client-side machine.

5. The system of claim 4 wherein the server-side executable is to collect the information identifying devices of the client-side machine from the database.

6. The system of claim 1 wherein the information about an execution environment includes one or more of information about an operating system of the client-side machine, information about a central processing unit of the client-side machine, and information about security settings of the client-side machine.

7. The system of claim 1 wherein the authenticator is further configured to render the client-side machine as not identified if the second hardware signature is not received by the authenticator during a limited time frame.

8. The system of claim 1 wherein the client-side machine includes a device, wherein the device has an associated authentication score to be added towards the threshold level.

9. The system of claim 8 wherein the authentication score is higher for associated devices that are less likely to be replaced or adjusted.

10. The system of claim 1 wherein the threshold level of matching indicates a number of devices identified in the second hardware signature that must also be identified in the first hardware signature.

11. A method comprising:
identifying, by a server, components of an execution environment of a client-side machine, wherein the components include an operating system and a central processing unit;
dynamically generating, on the server, a client-side executable suitable for operation in the execution environment of the client-side machine, and a corresponding server-side executable;
securely downloading the client-side executable from the server to the client-side machine, the client-side executable being associated with the server-side executable, and being configured to execute a subset of instructions from the server;
executing the server-side executable on the server to generate a first hardware signature, wherein the first hardware signature includes information identifying a first group of devices associated with the client-side machine;
executing the client-side executable on the client-side machine to generate a second hardware signature based on a second group of devices associated with the client-side machine; and
comparing, based on a threshold level of matching, the first hardware signature and the second hardware signature to authenticate the client-side machine, wherein the threshold level of matching indicates a number of devices that must be in the first and second groups for the client-side device to be authenticated.

12. The method of claim 11 further comprising collecting information, selected from a group including a dynamic information type of the client-side machine, a dynamic information order of the client-side machine and a dynamic amount of information of the client-side machine, for the client-side executable.

13. The method of claim 11, wherein the client-side executable includes at least one dynamic encryption instruction.

14. The method of claim 11 further comprising collecting information identifying the first group of hardware components associated with the client-side machine, and obfuscating the information collected.

15. The method of claim 11 further comprising collecting, from a server database, the first hardware signature for the server-side executable.

16. The method of claim 11 wherein the comparing is performed by an authenticator residing on the server.

17. The method of claim 16 further comprising imposing a time limit on receipt of the second result by the authenticator, wherein upon expiration of the time limit, the client-side machine is considered as not authenticated.

18. The method of claim 11 further comprising generating a plurality of instructions on the server; and dynamically selecting a subset of the plurality of instructions as the client-side executable.

19. The method of claim 11 further comprising:
updating the first hardware signature to identify a new device associated with the client-side machine.

20. A method for distributing executable software modules and granting access to resources based on operations performed by the executable software modules, the method comprising:
performing the following operations at a server,
collecting environment information about an execution environment of a client-side machine;
determining hardware information to be collected from the client-side machine;

creating a client-side software module configured to execute in the execution environment of the client-side machine, to collect the hardware information from the client-side machine, and to generate a first hardware signature based on the hardware information;

transmitting the client-side software module to the client-side machine;

receiving, from the client-side software module, the first hardware signature;

comparing the first hardware signature to a second hardware signature associated with the client-side machine;

granting the client-side device access to resources, wherein the granting is based on the comparison of the first and second hardware signatures.

21. The method of claim 20, wherein first hardware signature identifies a first group of devices of the client-side machine, and wherein the second hardware signature identifies a second group of devices, and wherein the comparing includes:

determining a number of the devices identified in both the first and second groups; and determining the number meets an authentication threshold value.

22. The method of claim 21 further comprising:

updating the second hardware signature to identify new devices of the client machine.

23. The method of claim 20, wherein the environment information identifies one or more of an operating system, security privileges, access rights, and a central processing unit.

24. The method of claim 20, wherein the hardware information includes information about devices of the client-side machine, wherein the devices include one or more of a hard disk drive, a Compact Disk Read Only Memory device, devices connected to the client side machine via a small computer system interface, and devices connected to the client side machine via a desktop management interface.

* * * * *